(No Model.) 2 Sheets—Sheet 1.
R. BAGALEY.
MACHINE FOR DETERMINING AND ADJUSTING THE BALANCE OF WHEELS OR OTHER BODIES.
No. 385,833. Patented July 10, 1888.
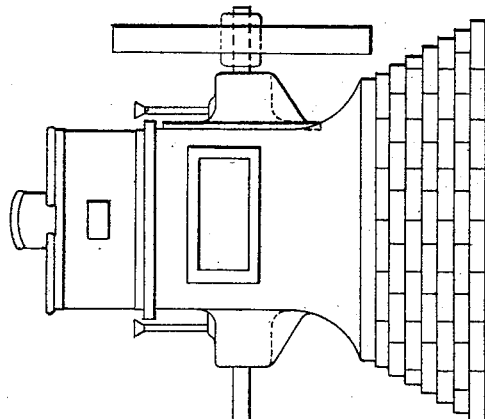
FIG. 1.
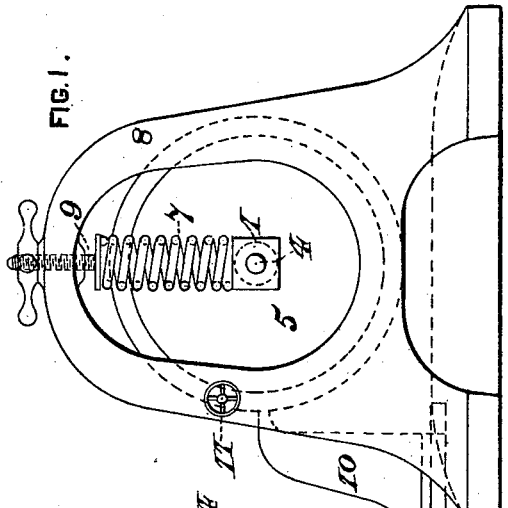
FIG. 2.
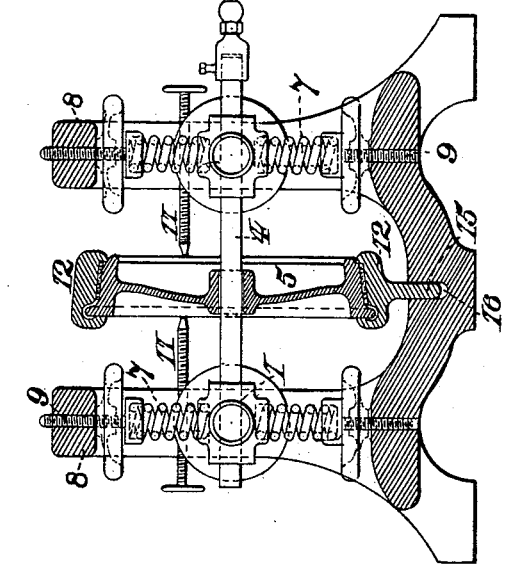
FIG. 3.
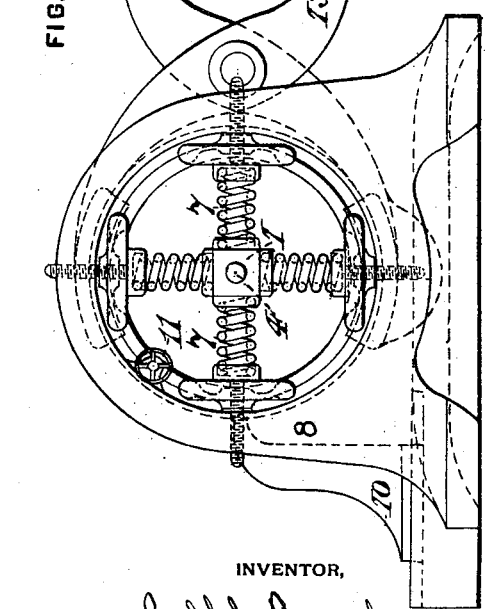
WITNESSES:
F. E. Gaither
M. S. Murphy
INVENTOR,
Ralph Bagaley
by Darwin S. Wolcott Att'y.

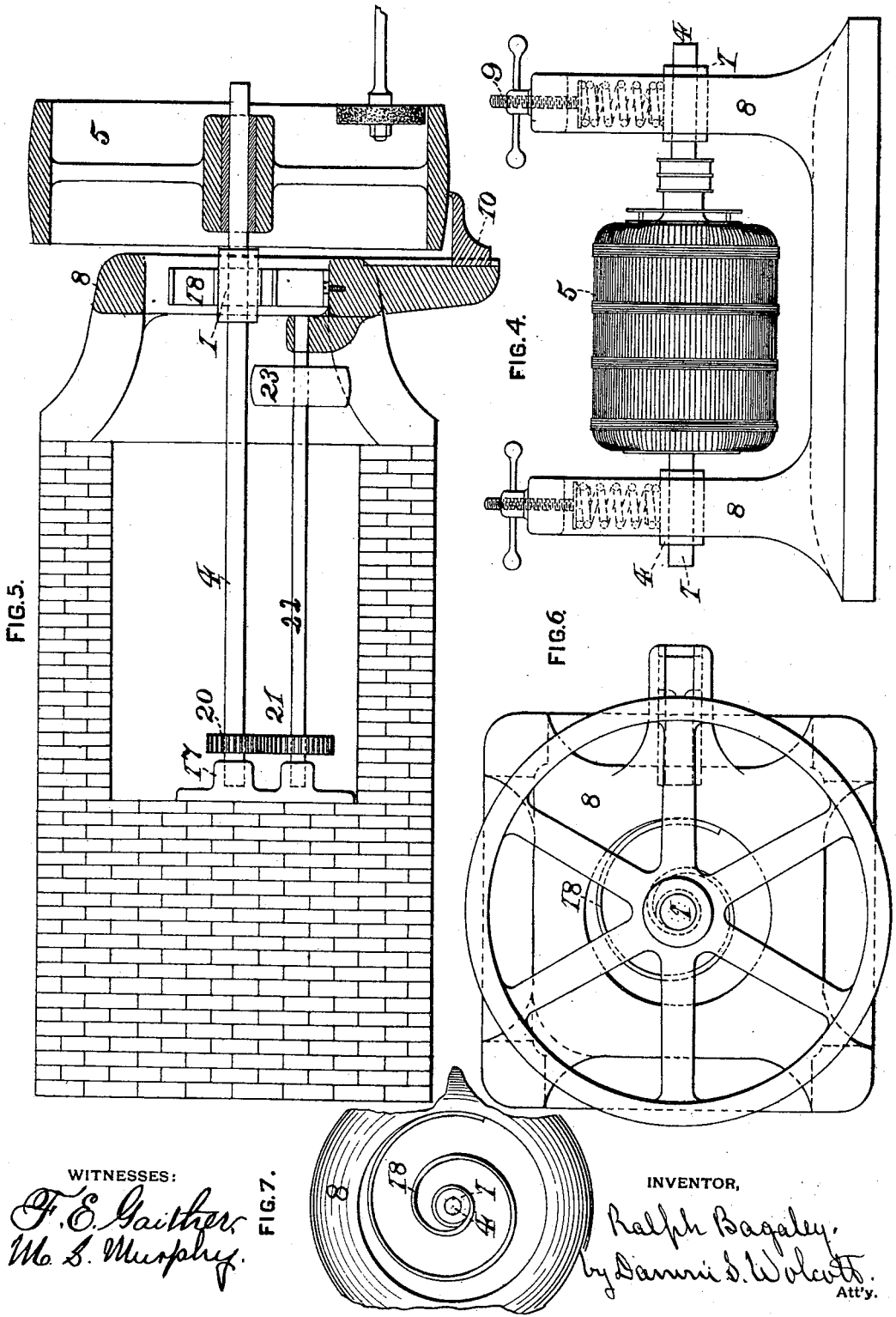

UNITED STATES PATENT OFFICE.

RALPH BAGALEY, OF PITTSBURG, PENNSYLVANIA.

MACHINE FOR DETERMINING AND ADJUSTING THE BALANCE OF WHEELS OR OTHER BODIES.

SPECIFICATION forming part of Letters Patent No. 385,833, dated July 10, 1888.

Application filed August 13, 1887. Serial No. 246,818. (No model.)

*To all whom it may concern:*

Be it known that I, RALPH BAGALEY, residing at Pittsburg, in the county of Allegheny and State of Pennsylvania, a citizen of the United States, have invented or discovered a certain new and useful Improvement in Machines for Determining and Adjusting the Balance of Wheels or other Bodies, of which improvement the following is a specification.

It is nearly, if not wholly, impracticable to manufacture wheels or other bodies capable of being rotated with such a uniform and proportioned distribution of metal that the wheel or other body when rotated around its axis or center of rotation will be perfectly or practically balanced—that is to say, so balanced that a point on said wheel or body will describe a true circle around and in a plane at right angles to its axis of rotation.

The object of the invention herein is to provide for the determination and location on wheels or other bodies of the excess or preponderance at one or more points of weight which tends to cause the wheel or other body to move in a circle eccentric to its axis of rotation or in a plane at an angle to such axis, and it is the object of the invention to provide for the correction of such error or disproportionate distribution of the metal.

In general terms, the invention consists in the construction and combination of elements substantially as hereinafter more fully described and claimed.

In the accompanying drawings, forming a part of this specification, Figure 1 is a view in end elevation of a simple form of apparatus for carrying out my invention. Fig. 2 is a view in section and elevation of an improved form of apparatus. Fig. 3 is an end elevation of the machine shown in Fig. 2. Fig. 4 is a side elevation of my improved apparatus having an armature of a dynamo-electric machine mounted therein. Fig. 5 is a view, partly in section and partly in elevation, of the form of machine for determining the balance of large pulleys or fly-wheels. Fig. 6 is a plan view of the apparatus shown in Fig. 5, and Fig. 7 is a detail view of the spring used in the form of machine shown in Figs. 5 and 6.

In Fig. 1 I have shown a simple embodiment of my invention, consisting of housings 8, within which the journal-boxes 1 are suspended by springs 7, of such character or construction that the journal-boxes are free to move with practical equality of freedom in all directions, the upper ends of the springs being connected to adjusting-screws 9, passing through the upper ends of the housings. In the journal-boxes, which have their axes in the same horizontal and vertical planes, is mounted shaft 4, having the wheel 5, whose balance is to be determined and corrected, secured thereon, preferably midway between the journal-boxes in order that the balance of the wheel may be more accurately determined and located. The wheel 5, having been mounted as above described, is rotated by any suitable means—as, for example, a flexible shaft, 6, or other connection from one end of the shaft 4 to the shaft of an engine or other motive power.

If the metal of the wheel undergoing the test is uniformly and proportionately distributed, a point on said wheel will describe a true circle whose center concides with the axis of the wheel when the latter is at rest or normal, and which will lie in a plane at right angles to the axis of the wheel; but if there is an excess of metal, or a preponderance of weight on one side of the axis of the wheel, the centrifugal force or action of such excess of weight will tend to carry the wheel around its axis when at normal, and as the springs will assist the centrifugal force in overcoming the action of gravity the wheel, together with the shaft, will be carried around the axis of the wheel when at normal—that part of the wheel having the preponderance of weight describing a circle of greater diameter than any other part of the wheel.

After the location of the excess of weight, as above described, the rotation of the wheel is stopped and a proportional quantity of metal removed by a file, chisel, or rotary grinding-disk. The wheel is again rotated, and if still out of balance at the same or another point, which is determined in the manner above stated, more metal is removed. This operation is continued until the rotation of the wheel indicates that the weight of metal is proportionately distributed by the coincidence of the center of the circle described by a point on the wheel with the axis of the wheel when at normal. If during the rotation of the wheel the ends of the shaft 4 should be swung back and forth in opposite directions, such movement would indicate that there is a lateral preponderance of weight on one side or the other of the wheel. If the ends of the shaft describe arcs of equal amplitude, there will be a preponderance of weight at two points on opposite sides of the axis, as at *a* and *b;* but if one end of the shaft describes an arc of greater amplitude than the other the preponderating weight will be greater at *a* than at *b*. If, however, one end of the shaft is stationary, or practically so, the prepondering weight will be at *a*. As in this case the wheel would revolve in a circle whose plane would be at an angle other than a right angle to the axis of the wheel when at normal, the location of the excess of weight could be determined by holding a piece of chalk in the path described by the edge or side of the wheel and the inequality removed, as above described. As the preponderance of metal at any point is, when the wheel is revolved an equal number of revolutions for an equal length of times, proportional to the amplitude of movement or angularity of plane of movement, the skilled mechanic can easily determine the amount of weight necessary to be removed.

A lateral preponderance of weight will be indicated by movements of the ends of the shaft, as above described, except that the ends will describe complete circles instead of arcs of circles.

Adjustable devices 10 and 11 are mounted on the bed-plate and housings of the machine for marking, as above stated, those parts of the wheel or other body where the preponderance or excess of weight exists.

In Figs. 2 and 3 I have shown the journal-boxes 1 supported or, rather, balanced on all sides by spiral springs 7, connected at their outer ends to adjusting-screws passing through the housings. In this form of apparatus the boxes 1 are so balanced that the wheel being tested is free to move in every direction under the influence of centrifugal force, and hence that part of the wheel having the preponderance of weight will tend to draw the wheel to one side of the axis of the wheel when at normal, and will be carried around such axis while revolving on its own axis, the part of the wheel having the excess of weight being constantly on the outer edge of the circle so described by the wheel. This form of apparatus is also provided with adjustable marking devices 10 and 11.

In order to obviate the necessity of removing the wheels from the apparatus shown in Figs. 1, 2, and 3, and also to hold the same stationary while adjusting its balance, I provide a pair of tongs having curved jaws 12, lined with rubber or other suitable material, which will aid the jaws in taking a firm grip upon the periphery of the wheels. The handles 13 are provided with a clamping device, 14, for holding the jaws in engagement with the wheel. On the back of the lower jaw is formed a rib, 15, adapted to fit within a groove, 16, in the bed-plate of the machine, so as to prevent any lateral movement of the tongs and wheel while the error in the distribution of the metal is being corrected. After the location of the preponderance of weight has been determined, the tongs are secured to the wheel, which is then drawn outside of the housings a sufficient distance to permit of access to the part from which metal is to be removed. The excess of metal can then be removed by chipping or filing, or by a portable emery-wheel, which can be forced against the wheel, which is at the same time reciprocated by raising and lowering the handles of the tongs.

In Fig. 4 is shown my machine as applied for testing the armatures of dynamo-electric machines. The location of the preponderance of weight is determined in the same manner as above described; but as it is impracticable to remove a portion of the metal of the armature the balance can be effected by adding a counterbalancing-weight to that part of the wheel diametrically opposite the part indicated as having a preponderance of weight.

In Figs. 5 and 6 is shown a form of apparatus for adjusting the peripheral balance of pulleys, fly-wheels, and other large bodies capable of being rotated. In this form of apparatus the shaft 4 is arranged vertically, its lower end being mounted in a step or bearing, 17, secured to a suitable foundation, preferably arranged in a pit. The movable journal-box 1 is held in normal position and in line with the bearing 17 by a helical spring, 18, in lieu of a series of spiral springs, as shown in Figs. 2 and 3. The journal-box is secured at the center of the helical spring, whose outer end is attached to a frame or housing, 8, surrounding the upper end of the shaft 4. A pinion, 20, is secured on the shaft as near as possible to its lower end, said pinion 20 intermeshing with a similar pinion, 21, on the counter-shaft 22, supported in suitable bearings and driven by a belt passing over the pulley 23. The wheel to be balanced is secured in any suitable manner to the shaft 4 and revolved at the required speed by the mechanism above described. In case of a peripheral preponderance of weight at any point, the wheel will move in the manner described in connection with Figs. 2 and 3; but the shaft 4, in lieu of generating a cylinder in its movement, will describe a cone whose apex is at the lower end of the shaft 4. As this apparatus is adapted for the determination of peripheral lack of balance only, the adjustable marking device 10 is used.

The principal characteristic of my invention consists in supporting a wheel or other body capable of being rotated on bearings free to move equally in all directions, and then rotating the same on its axis for the determination of the balance or lack of balance of such wheel or other body, and, further, by means of suitable devices in accurately locating and correcting the excess or preponderance of weight at any point, whether such excess of weight tends to cause the wheel to be carried around its axis when at rest or around its center of gravity, or to cause it to rotate in a plane other than one at right angles to its axis when at rest or normal.

The preponderance of weight at any part or parts of a wheel or other body can be eliminated, either by cutting away a portion of the metal at that part or parts or by adding weight or weights to the opposite part or parts of the wheel, and in some cases both means may be conveniently and advantageously employed.

In the foregoing description no account is taken of disturbance which might result from the manner of applying the power for rotating the wheel. The skilled mechanic can guard against such disturbance or make due allowance therefor.

I am aware that machines have been made for the purpose of testing rotating bodies having the bearings for the shaft carrying the body to be tested movable or yielding with greater freedom in some directions than in others, whereby the lack of balance or preponderance of weight on one part of the rotating body could be determined approximately, but not with such a degree of accuracy as would admit of the ready correction or removal of such preponderating weight. The reason of this inaccuracy of movement is the inequality or, rather, the irregularity of the path described by the body in rotating, such path being approximately a flattened ellipse, and hence when a marker is applied to the rotating body it indicates thereon a larger area for correction than necessary, and hence it might happen that a greater amount of material would be removed from the wheel than necessary for the correction thereof, thereby necessitating another testing of this body and removal of material from another part.

In machines constructed as described herein—i. e., with the bearings for the shaft having an equal freedom of movement in all directions—the marker when applied to the wheel would indicate only the point at which the excess of weight was located.

I claim herein as my invention—

1. In an apparatus for balancing wheels or other bodies capable of being rotated, the combination of a shaft carrying the wheel or other body and one or more bearings therefor, fitted with a capacity of movement equal in all directions, substantially as set forth.

2. In an apparatus for balancing wheels or other bodies capable of being rotated, the combination of a shaft carrying the wheel or other body to be balanced, journal-boxes for said shaft, and one or more spiral springs supporting said journal-boxes, substantially as set forth.

3. In an apparatus for balancing wheels or other bodies capable of being rotated, the combination of standards or housings having openings therein, journal boxes or bearings free to move equally in all directions in said openings, springs for supporting said boxes or bearings centrally or approximately so in said openings, and a shaft carrying the wheel or other body to be balanced mounted in the boxes or bearings, substantially as set forth.

4. In an apparatus for balancing wheels or other bodies capable of being rotated, the combination of a shaft carrying the wheel or body to be balanced, one or more bearings for said shaft having yielding support or supports, and a clamp for holding said wheel or body stationary, substantially as set forth.

5. In an apparatus for balancing wheels or other bodies capable of being rotated, the combination of a shaft carrying the wheel or body to be balanced, one or more bearings for said shaft having yielding support or supports, and a marker, substantially as set forth.

6. In an apparatus for balancing wheels or other bodies capable of being rotated, the combination of a shaft carrying the wheel or body to be balanced, one or more bearings for said shaft having yielding support or supports, and an adjustable marker, substantially as set forth.

7. In an apparatus for balancing wheels or other bodies capable of being rotated, the combination of a frame having a slotted base, a shaft carrying the wheel or other body, one or more yielding or resilient bearings for said shaft arranged in said frame, and a clamp for grasping the wheel and provided with a rib engaging the slot in the base of the frame, substantially as set forth.

In testimony whereof I have hereunto set my hand.

RALPH BAGALEY.

Witnesses:
J. LINCOLN RALPH,
DARWIN S. WOLCOTT.